(12) United States Patent
Li et al.

(10) Patent No.: US 10,679,085 B2
(45) Date of Patent: Jun. 9, 2020

(54) APPARATUS AND METHOD FOR DETECTING SCENE TEXT IN AN IMAGE

(71) Applicant: The University of Florida Research Foundation, Incorporated, Gainesville, FL (US)

(72) Inventors: Xiaolin Li, Gainesville, FL (US); Pan He, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 119 days.

(21) Appl. No.: 16/170,285

(22) Filed: Oct. 25, 2018

(65) Prior Publication Data

US 2019/0130204 A1  May 2, 2019

Related U.S. Application Data

(60) Provisional application No. 62/579,324, filed on Oct. 31, 2017.

(51) Int. Cl.
| | |
|---|---|
| *G06K 9/32* | (2006.01) |
| *G06T 7/194* | (2017.01) |
| *G06K 9/46* | (2006.01) |
| *G06N 5/04* | (2006.01) |
| *G06K 9/62* | (2006.01) |

(52) U.S. Cl.
CPC ......... *G06K 9/3258* (2013.01); *G06K 9/4628* (2013.01); *G06K 9/4671* (2013.01); *G06K 9/6274* (2013.01); *G06N 5/046* (2013.01); *G06T 7/194* (2017.01); *G06K 2209/01* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,470,094 B1 * | 10/2002 | Lienhart | ................ | G06K 9/325 382/171 |
| 7,570,816 B2 * | 8/2009 | Bargeron | ........... | G06K 9/00442 382/224 |
| 2005/0259866 A1 * | 11/2005 | Jacobs | ............... | G06K 9/00463 382/157 |
| 2015/0055866 A1 * | 2/2015 | Cummins | .............. | G06K 9/344 382/176 |

* cited by examiner

*Primary Examiner* — Tsung Yin Tsai
(74) *Attorney, Agent, or Firm* — Alston & Bird LLP

(57) ABSTRACT

Computer program products, methods, systems, apparatus, and computing entities provide a unique single-shot text detector that generates word-level text bounding boxes in an image by at least identifying text regions in the image via an automatically learned attention map and by conducting pixel-wise review of text; aggregating multi-scale inception features; generating, based at least in part on the multi-scale inception features, a set of aggregated inception features; and generating, using at least the set of aggregated inception features, the word-level text bounding boxes in the image.

18 Claims, 8 Drawing Sheets

APPARATUS AND METHOD FOR DETECTING SCENE TEXT IN AN IMAGE

CROSS-REFERENCE TO RELATED APPLICATIONS

This application claims priority to U.S. Provisional Application No. 62/579,324 filed Oct. 31, 2107, which is hereby incorporated herein in its entirety by reference.

BACKGROUND

Example embodiments described herein relate to text detection; in particular, to methods and apparatus for detecting text in an image and generating word-level text bounding boxes in a natural image. Reading text "in the wild" has attracted increasing attention in computer vision community. It has numerous potential applications in image retrieval, industrial automation, robot navigation, and scene understanding, among other areas. It remains a challenging problem. The main difficulty of such text interpretation processes lies in the vast diversity in text scale, orientation, illumination, and font present in real-world environments, which often come with highly complicated backgrounds.

Previous methods for text detection in such environments have been dominated by bottom-up approaches, which often contain multiple sequential steps, including character or text component detection, followed by character classification or filtering, text line construction and word splitting. Character detection and filtering steps play a key role in such bottom-up approaches. Previous methods typically identify character or text component candidates using connected component based approaches (e.g., stroke width or extremal region), or sliding window methods. However, both groups of methods commonly suffer from two main limitations which significantly reduce their efficiencies and performance. First, such text detection methods are built on identification of individual characters or components, making it difficult to explore regional context information. This often results in a low recall where ambiguous characters are easily discarded. It also leads to a reduction in precision, by generating a large number of false detections. Second, multiple sequential steps make the system highly complicated, and errors are easily accumulated in the later steps.

BRIEF SUMMARY

In general, embodiments of the present invention provide methods, apparatus, systems, computing devices, computing entities, and/or the like for detecting scene text in an image.

In accordance with one aspect, a method is provided. In one embodiment, the method comprises identifying text regions in an image via an automatically learned attention map and by conducting pixel-wise review of text; aggregating multi-scale inception features; generating, based at least in part on the multi-scale inception features, a set of aggregated inception features; and generating, using at least the set of aggregated inception features, word-level text bounding boxes in the image.

In accordance with another aspect, a computer program product is provided. The computer program product may comprise at least one computer-readable storage medium having computer-readable program code portions stored therein, the computer-readable program code portions comprising executable portions configured to identify text regions in an image via an automatically learned attention map and by conducting pixel-wise review of text; aggregate multi-scale inception features; generate, based at least in part on the multi-scale inception features, a set of aggregated inception features; and generate, using at least the set of aggregated inception features, word-level text bounding boxes in the image.

In accordance with yet another aspect, an apparatus comprising at least one processor and at least one memory including computer program code is provided. In one embodiment, the at least one memory and the computer program code may be configured to, with the processor, cause the apparatus to identify text regions in an image via an automatically learned attention map and by conducting pixel-wise review of text; aggregate multi-scale inception features; generate, based at least in part on the multi-scale inception features, a set of aggregated inception features; and generate, using at least the set of aggregated inception features, word-level text bounding boxes in the image.

BRIEF OVERVIEW

Figure 1:
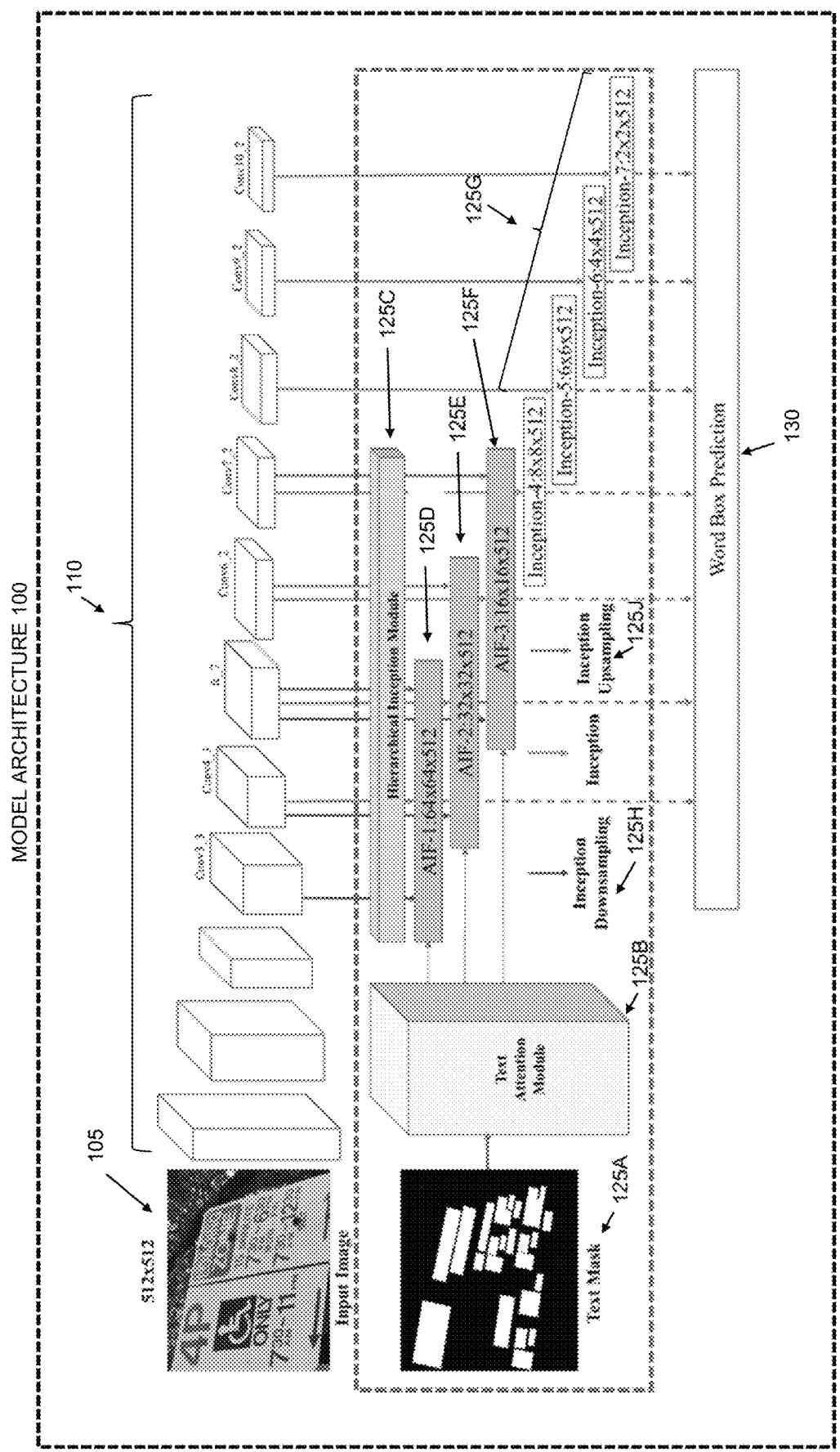
FIG. 1 illustrates an overall pipeline of an apparatus or a system for detecting text in an image according to an embodiment of the present application.

Example embodiments described herein provide a unique single-shot text detector that directly generates word-level text bounding boxes in an image or rendering for virtual or augmented reality. The method proposed an attention mechanism which roughly identifies text regions via an automatically learned attention map. This substantially suppresses background interference in the convolutional features, which is the key to producing accurate inferences of words, particularly at extremely small sizes. Background suppression is accomplished by, at the training stage, providing supervised information such as ground truth masks defining a separation between background and foreground information. This supervised information traines the model to shift its attention to the foreground regions, which simulates the selective attention mechanism of the Human Visual System. This results in a single model that essentially works in a coarse-to-fine manner, rather than the fine-to-coarse mechanisms used by traditional systems as described above. Moreover, example embodiments depart from recent Fully Convolutional Networks (FCN)-based text detectors which cascade multiple FCN models to achieve an accurate prediction. Furthermore, embodiments described herein utilize a hierarchical inception module which efficiently aggregates multi-scale inception features, which enhances local details, and also encodes strong context information, allowing the detector to work reliably on multi-scale and multi-orientation text with single-scale images.

Alternative methods are disclosed for building upon FCN methods by producing pixel-wise prediction of text or non-text. These methods (referred to herein as pixel-based text detectors) cast previous character-based detections into the problem of text semantic segmentation. In spite of effectively identifying rough text regions, previous methods fail to produce accurate word-level predictions with a single model. The main challenge is to precisely identify individual words from a detected rough region of text.

Another group of methods are developed for direct prediction of text bounding boxes, by extending from the state-of-the-art object detectors, such as Faster Region-based Convolutional Neural Networks (R-CNN) and Single Shot Multibox Detector (SSD). R-CNN and SSD methods aim to predict text boxes directly by sliding a window through the convolutional features (and accordingly these methods are sometimes referred to as box-based text detectors). Previous box-based text detectors are often trained by simply using bounding box annotations, which may be too coarse (high-level) to provide a direct and detailed supervision, compared to the pixel-based approaches where a text mask is provided. This makes it difficult for the models to learn sufficient word information in detail, leading to accuracy loss in one-shot prediction of words, particularly for small-scale ones.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Computer Program Products, Methods, and Computing Entities

Embodiments of the present invention may be implemented in various ways, including as computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory, multimedia memory cards (MMC), secure digital (SD) memory cards, Memory Sticks, and/or the like. Further, a non-volatile computer-readable storage medium may also include conductive-bridging random access memory (CBRAM), phase-change random access memory (PRAM), ferroelectric random-access memory (FeRAM), resistive random-access memory (RRAM), Silicon-Oxide-Nitride-Oxide-Silicon memory (SONOS), racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Rambus in-line memory module (RIMM), dual in-line memory module (DIMM), single in-line memory module (SIMM), video random access memory VRAM, cache memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations, respectively, may be implemented in the form of a computer program product, an entirely hardware embodiment, a combination of hardware and computer program products, and/or apparatus, systems, computing devices, computing entities, and/or the like carrying out instructions on a computer-readable storage medium for execution. Such embodiments can produce specifically-configured machines performing the steps or operations specified in the block diagrams and flowchart illustrations. Accordingly, the block diagrams and flowchart illustrations support various combinations of embodiments for performing the specified steps or operations.

II. Exemplary Architecture

Figure 5:
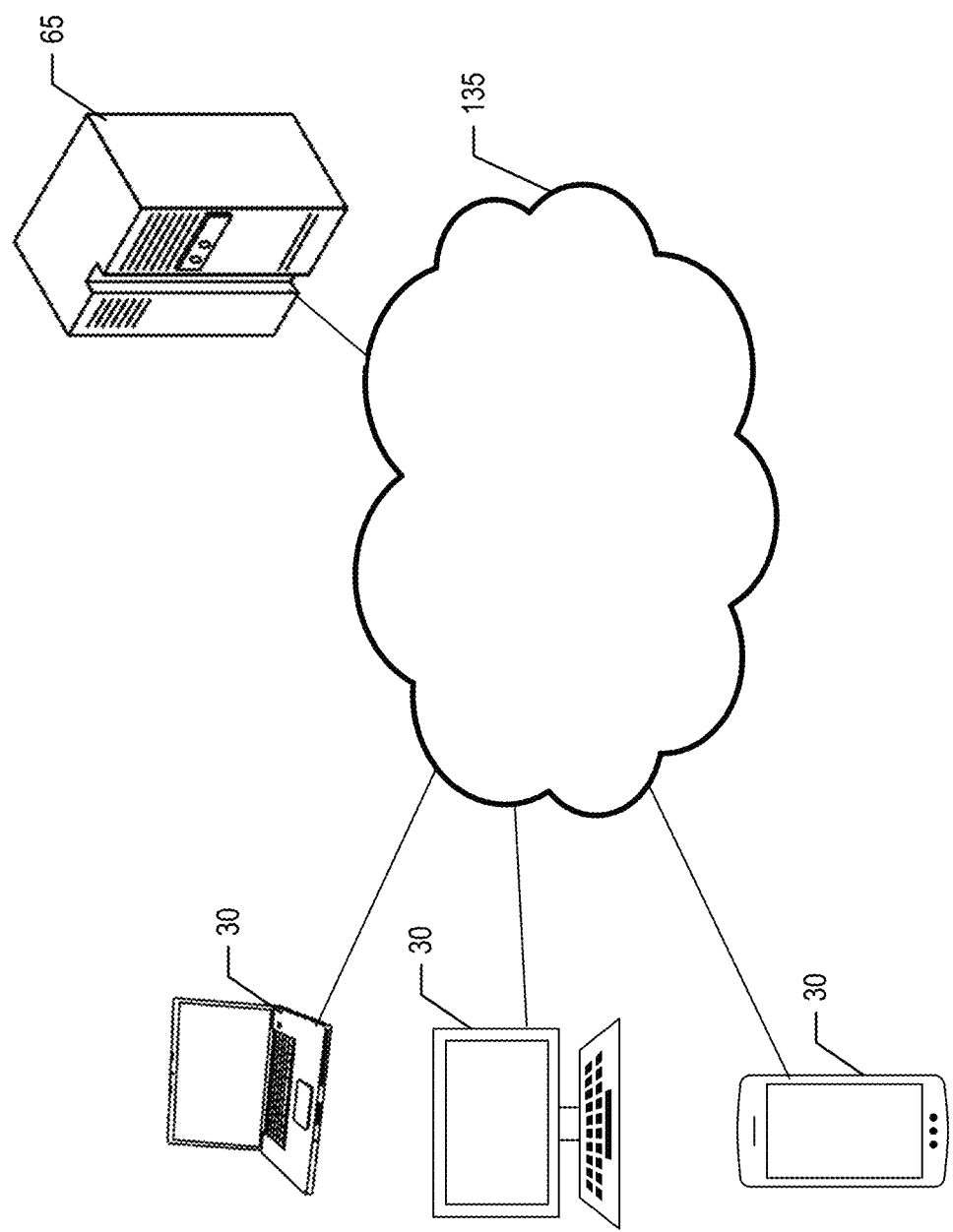
FIG. 5 is an overview of a system that can be used to practice embodiments of the present disclosure.

FIG. 5 provides an illustration of a platform that can be used in conjunction with various embodiments of the present invention. As shown in FIG. 5, the platform may comprise one or more server systems 65, one or more user computing entities 30, one or more networks 135, and/or the like. Each of the components of the system may be in electronic communication with, for example, one another over the same or different wireless or wired networks 135 including, for example, a wired or wireless Personal Area Network (PAN), Local Area Network (LAN), Metropolitan Area Network (MAN), Wide Area Network (WAN), and/or the like. Additionally, while FIG. 5 illustrate certain system entities as separate, standalone entities, the various embodiments are not limited to this particular architecture.

1. Exemplary Server System

Figure 6:
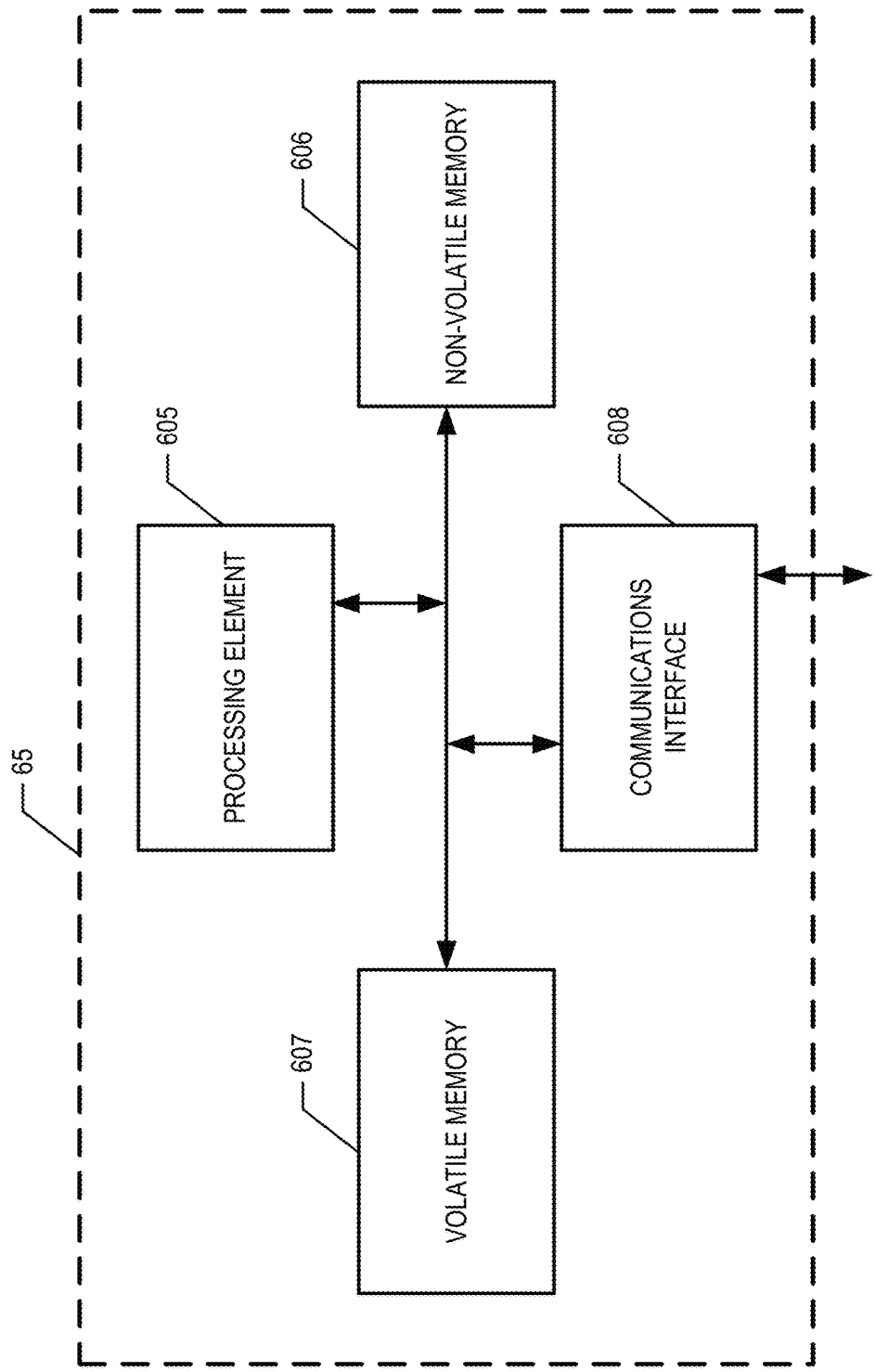
FIG. 6 is an exemplary schematic diagram of a server system according to one embodiment of the present disclosure.
Figure 7:
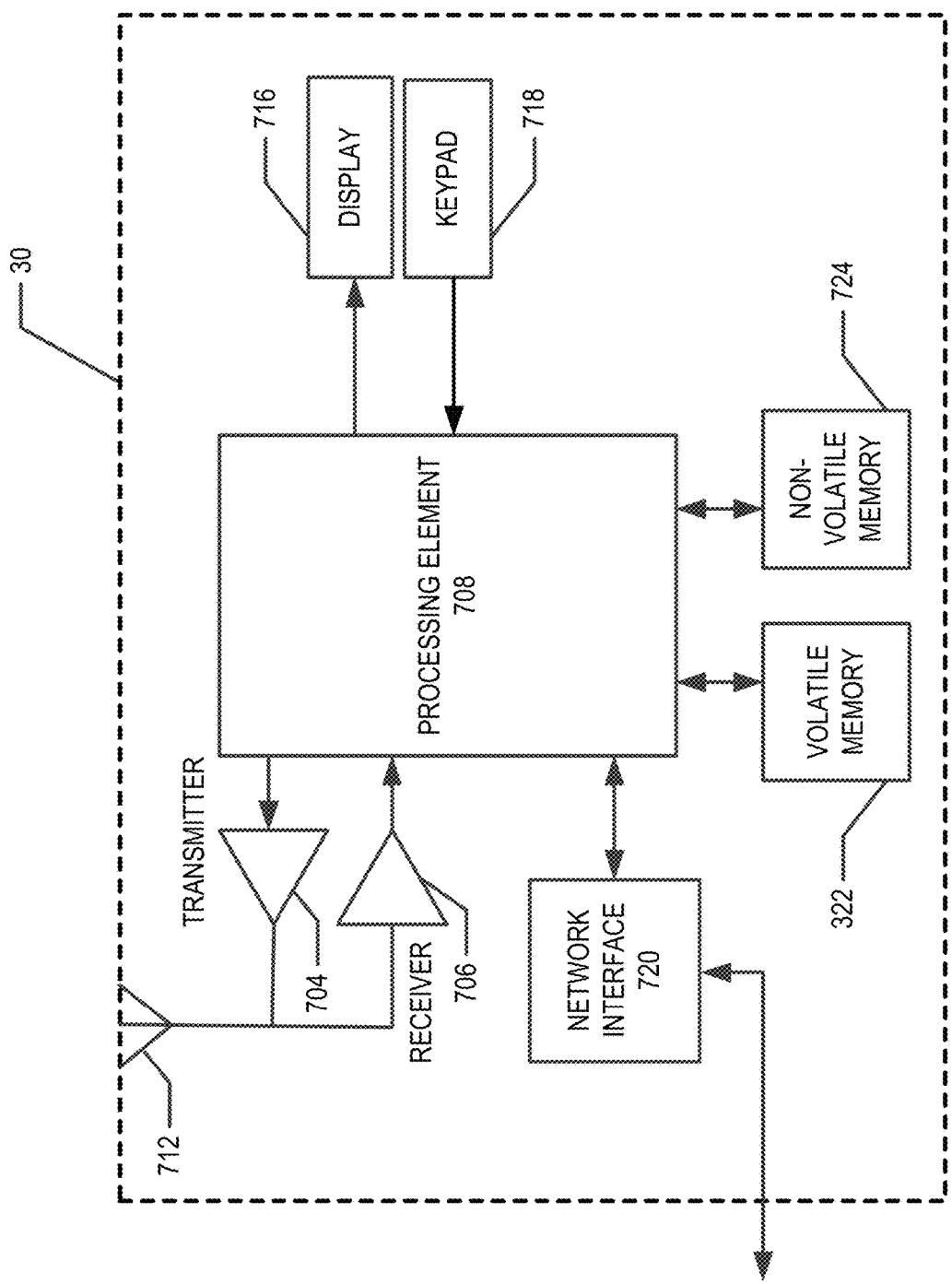
FIG. 7 is an exemplary schematic diagram of a user computing entity according to one embodiment of the present disclosure.

FIG. 6 provides a schematic of a server system 65 according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the server system 65 may also include one or more network interfaces and/or communications interfaces 608 for communicating with various computing entities, such as by communicating data, content, information, and/or similar terms used herein interchangeably that can be transmitted, received, operated on, processed, displayed, stored, and/or the like. For instance, the server system 65 may communicate with other computing entities 65, one or more user computing entities 30, and/or the like.

As shown in FIG. 6, in one embodiment, the server system 65 may include or be in communication with one or more processing elements 605 (also referred to as processors, processing circuitry, and/or similar terms used herein interchangeably) that communicate with other elements within the server system 65 via a bus, for example, or network connection. As will be understood, the processing element 605 may be embodied in a number of different ways. For example, the processing element 605 may be embodied as one or more complex programmable logic devices (CPLDs), microprocessors, multi-core processors, coprocessing entities, application-specific instruction-set processors (ASIPs), and/or controllers. Further, the processing element 605 may be embodied as one or more other processing devices or circuitry. The term circuitry may refer to an entirely hardware embodiment or a combination of hardware and computer program products. Thus, the processing element 605 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 605 may be configured for a particular use or configured to execute instructions stored in volatile or non-volatile media or otherwise accessible to the processing element 605. As such, whether configured by hardware or computer program products, or by a combination thereof, the processing element 605 may be capable of performing steps or operations according to embodiments of the present invention when configured accordingly.

In one embodiment, the server system 65 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 606 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

Memory media 606 may also be embodied as a data storage device or devices, as a separate database server or servers, or as a combination of data storage devices and separate database servers. Further, in some embodiments, memory media 606 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third party provider and where some or all of the information/data required for the operation of the system may be stored. As a person of ordinary skill in the art would recognize, the information/data required for the operation of the system may also be partially stored in the cloud data storage system and partially stored in a locally maintained data storage system.

Memory media 606 may include information/data accessed and stored by the system to facilitate the operations of the system. More specifically, memory media 606 may encompass one or more data stores configured to store information/data usable in certain embodiments.

In one embodiment, the server system 65 may further include or be in communication with volatile media (also referred to as volatile storage, memory, memory storage, memory circuitry and/or similar terms used herein interchangeably). In one embodiment, the volatile storage or memory may also include one or more volatile storage or memory media 607 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 708. Thus, the databases, database instances, database management system entities, data, applications, programs, program modules, scripts, source code, object code, byte code, compiled code, interpreted code, machine code, executable instructions, and/or the like may be used to control certain aspects of the operation of the server system 65 with the assistance of the processing element 605 and operating system.

As indicated, in one embodiment, the server system 65 may also include one or more network and/or communications interfaces 608 for communicating with various computing entities, such as by communicating data, content, information, and/or similar terms used herein interchangeably that can be transmitted, received, operated on, processed, displayed, stored, and/or the like. For instance, the server system 65 may communicate with computing entities or communication interfaces of other computing entities 65, user computing entities 30, and/or the like.

As indicated, in one embodiment, the server system 65 may also include one or more network and/or communications interfaces 608 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the server system 65 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The server system 65 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the server system's components may be located remotely from other server system 65 components, such as in a distributed system. Furthermore, one or more of the components may be aggregated and additional components performing functions described herein may be included in the server system 65. Thus, the server system 65 can be adapted to accommodate a variety of needs and circumstances.

2. Exemplary User Computing Entity

Figure 8:
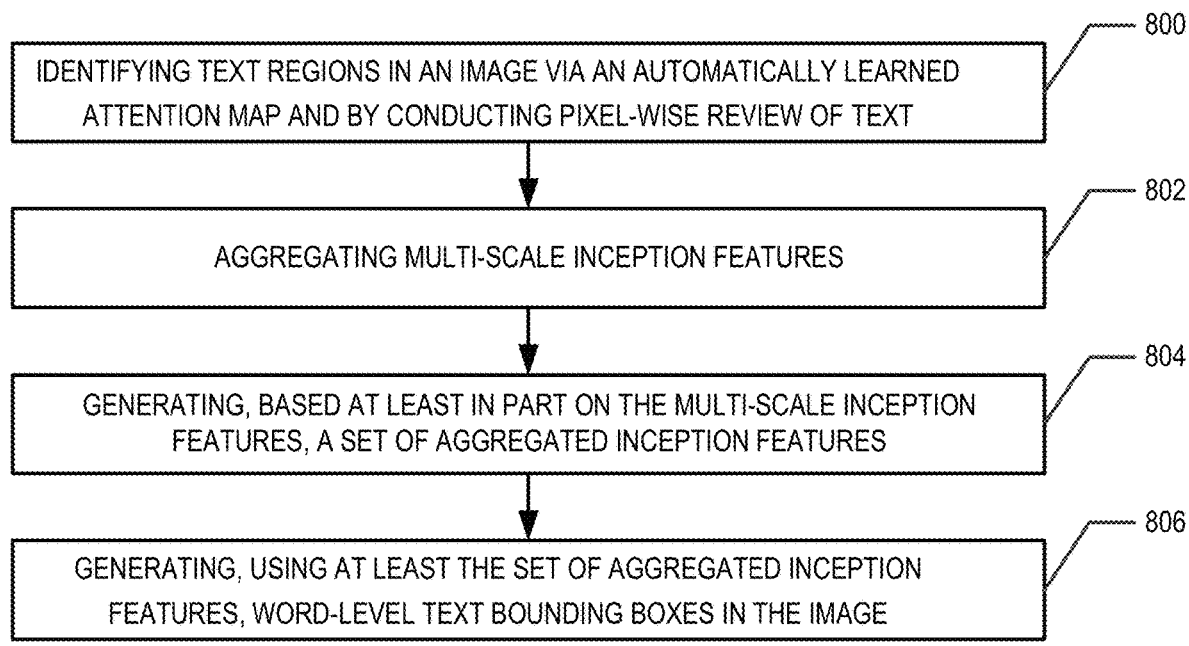
FIG. 8 provides flowchart illustrating operations and processes that can be used in accordance with various embodiments of the present disclosure.

FIG. 8 provides an illustrative schematic representative of user computing entity 30 that can be used in conjunction with embodiments of the present invention. As will be recognized, the user computing entity may be operated by an agent and include components and features similar to those described in conjunction with the server system 65. Further, as shown in FIG. 8, the user computing entity may include additional components and features. For example, the user computing entity 30 can include an antenna 712, a transmitter 704 (e.g., radio), a receiver 706 (e.g., radio), and a processing element 708 that provides signals to and receives signals from the transmitter 704 and receiver 706, respectively. The signals provided to and received from the transmitter 704 and the receiver 706, respectively, may include signaling information/data in accordance with an air interface standard of applicable wireless systems to communicate with various entities, such as a server system 65, another user computing entity 30, and/or the like. In this regard, the user computing entity 30 may be capable of operating with one or more air interface standards, communication protocols, modulation types, and access types. More particularly, the user computing entity 30 may operate in accordance with any of a number of wireless communication standards and protocols. In a particular embodiment, the user computing entity 30 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol. The user computing entity 30 may also operate in accordance with multiple wired communication standards and protocols via the network interface 720.

Via these communication standards and protocols, the user computing entity 30 can communicate with various other entities using concepts such as Unstructured Supplementary Service data (USSD), Short Message Service (SMS), Multimedia Messaging Service (MIMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data/data may be determined by triangulating the position in connection with a variety of other systems, including cellular towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 30 may also comprise a user interface comprising one or more user input/output interfaces (e.g., a display 716 and/or speaker/speaker driver coupled to a processing element 708 and a touch screen, keyboard, mouse, and/or microphone coupled to a processing element 708). For example, the user output interface may be configured to provide an application, browser, user interface, dashboard, webpage, and/or similar words used herein interchangeably executing on and/or accessible via the user computing entity 30 to cause display or audible presentation of information/data and for user interaction therewith via one or more user input interfaces. The user output interface may be updated dynamically from communication with the server system 65. The user input interface can comprise any of a number of devices allowing the user computing entity 30 to receive data, such as a keypad 718 (hard or soft), a touch display, voice/speech or motion interfaces, scanners, readers, or other input device. In embodiments including a keypad 718, the keypad 718 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 30 can collect information/data, user interaction/input, and/or the like.

The user computing entity 30 can also include volatile storage or memory 722 and/or non-volatile storage or memory 724, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 30.

3. Exemplary Networks

In one embodiment, the networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), MANs, WANs, LANs, or PANs. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

III. Exemplary System Operation

Example embodiments of the present application are described below with reference to the accompanying drawings in detail.

Figure 4:
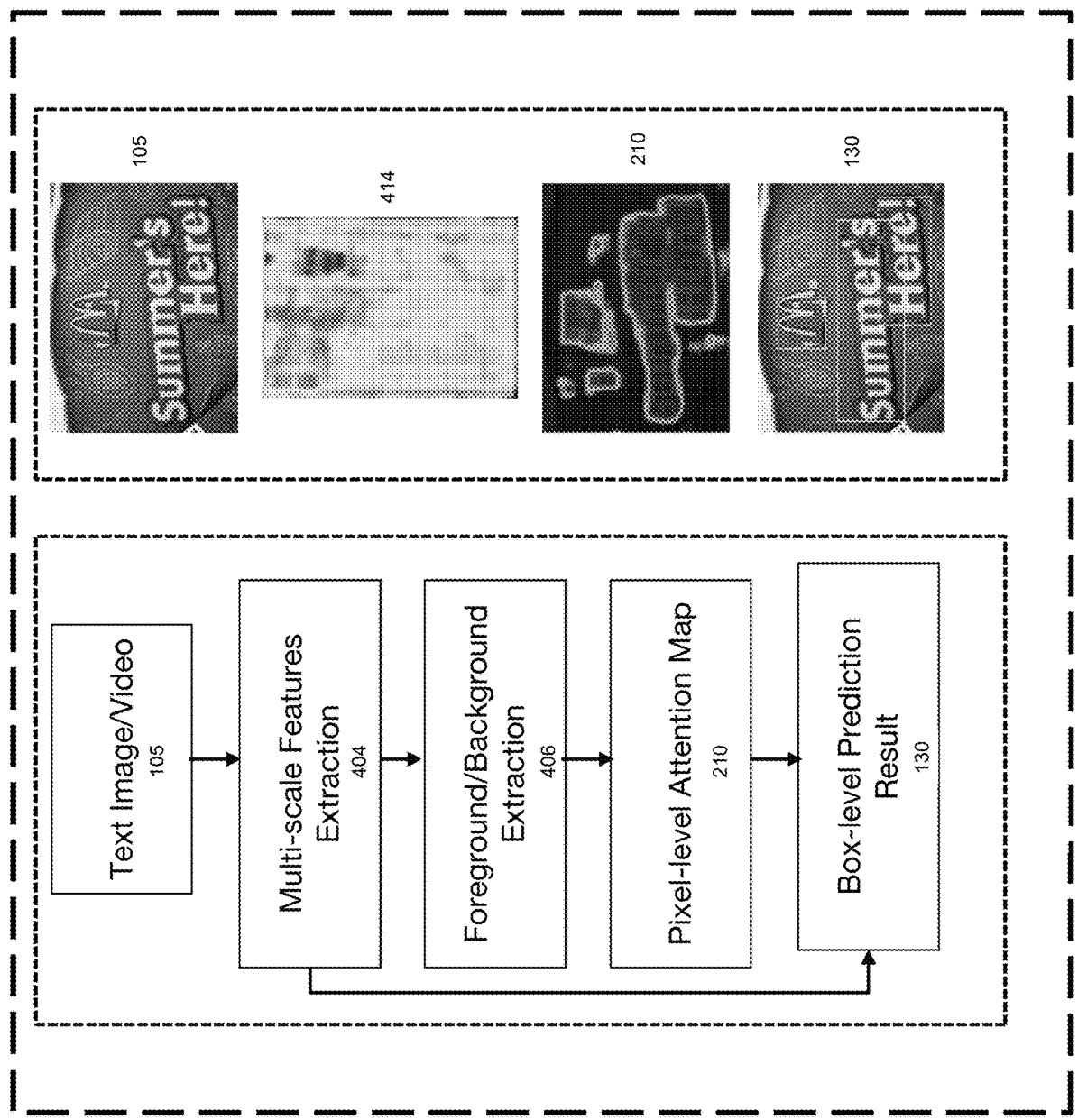
FIG. 4 illustrates the text attention mechanism according to an embodiment of the present application.

FIG. 4 illustrates a text attention mechanism according to an embodiment of the present application. As shown in FIG. 4, at the beginning, multi-scale features are extracted 404 from the input image/video 105. After extracting the foreground/background 406 data from the multi-scale features, a rough text regional attention 414 is automatically learned by embodiments of the present invention, which is used to highlight text information 210 in the convolutional features. This makes it possible to achieve accurate word-level predictions 130 in one shot. Text can be then precisely separated and accurately predicted at the word level in challenging cases.

According to one embodiment, the coarse-to-fine detection pipeline cascades two fully convolutional network (FCN) models. The second FCN produces word or character-level predictions on a cropped text region detected by the first one. This inevitably increases system complexity. Instead, as shown in FIG. 1, the embodiment casts the cascaded FCNs detectors into a single model 100 by introducing the attention module 125B, which enables a direct mask supervision that explicitly encodes detailed text information in training, and functions on an implicit text region detection in testing. This elegantly bridges the gap between the pixel-based approaches and the box-based text detectors, resulting in a single-shot model that essentially works in a coarse-to-fine manner.

FIG. 1 illustrates an overall pipeline of an apparatus or a system for generating boundary boxed indication of text in an image according to an embodiment of the present application. As shown in the FIG. 1, the example embodiment contains three main parts: a convolutional part 110, a text-specific part 125B and 125C, and a word box prediction part 130. The text-specific part (the region with blue dashed line in FIG. 1) comprises a Text Attention Module (TAM) 125B and a Hierarchical Inception Module (HIM) 125C. The TAM 125B introduces a new pixel-wise supervision of text, allowing the model to automatically learn text attention map 210 which identifies rough text regions 414. And the HIM 125C aggregates multi-layer inception modules 125G and enhances the convolutional features 302.

Figure 2:
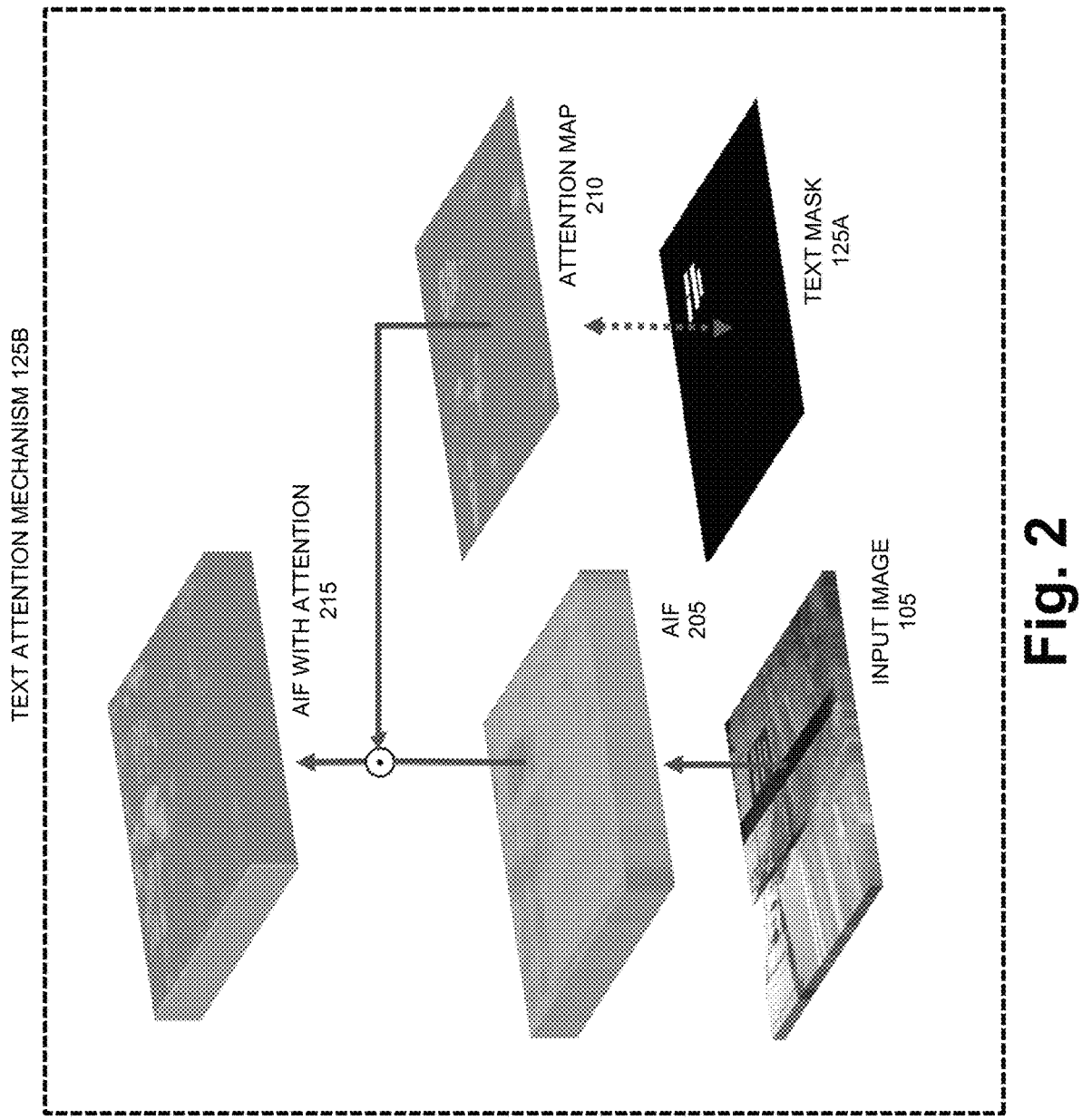
FIG. 2 is the structure of a text attention map from aggregated inception features according to an embodiment of the present application.

FIG. 2 illustrates the structure of a text attention map 210 from Aggregated Inception Features (AIFs) 205 according to an embodiment of the present application. The attention module is able to automatically learn rough spatial regions of text 412 from the convolutional features 302. This attention to text is then directly encoded back into the convolutional features 302, where text-related features are strongly enhanced by reducing background interference 406 in the convolutional maps.

The attention module is built on the Aggregated Inception Feature (AIF) 205 (described later). It generates a pixel-wise probability heatmap which indicates the text probability at each pixel location. This probability heatmap is referred as the attention map 210 which has an identical size of an input image 105 and will be downsampled for each prediction layer. The attention module 125B includes two 3×3 convolutional layers with pad 1, one deconvolution (upsampling with bilinear operation) layer which connects the AIF 205 to the attention map 210. Then the attention map 210 is generated by using a softmax activation function on the de-convoluted features. Specifically, given an input image of 512×512, we get the first-layer AIF features 125D, $F_{AIF1} \in R^{64 \times 64 \times 512}$ The attention map 210, $\alpha^+ \in R^{512 \times 512}$, is computed as, $$D_{AIF1} = \mathrm{deconv}_{3\times 3}(F_{AIF1}), \quad (1)$$

$$\overline{D}_{AIF1} = \mathrm{conv}_{1\times 1}(D_{AIF1}), \quad (2)$$

$$\alpha = \mathrm{softmax}(\overline{D}_{AIF1}). \quad (3)$$

$D_{AIF1} \in R^{512 \times 512 \times 512}$ is the de-convoluted feature maps, which are further projected to 2-channel maps, $\overline{D}_{AIF1} \in R^{512 \times 512 \times 512}$ using 1×1 kernels, followed by a softmax function. Then the positive part of the softmax maps, $\alpha^+$, is the attention map 210, indicating pixel-wise possibility of text 408. The attention map 210 is further encoded into the AIF by simply resizing it as with spatial size, $$\hat{\alpha}^+ = \mathrm{resize}(\alpha^+), \quad (4)$$

$$\hat{F}_{AIF1} = \hat{\alpha}^+ \lfloor F_{AIF1}. \quad (5),$$

where $\hat{\alpha}^+ \in R^{64 \times 64}$ is the resized attention map, and ⌊ indicates element-wise dot production across all channel of the AIF maps 205. $\hat{F}_{AIF1}$ 215 is the resulted feature maps with encoded text regional attention.

The text attention information is learned automatically in the training process. An auxiliary loss is introduced to provide a direct and detailed supervision to guide the model to shift its attention to text regions via a binary mask that indicates text or non-text at each pixel location. A softmax function is used to optimize this attention map toward the provided text mask 125A, explicitly encoding strong text information into the attention module 125B. The proposed attention module 125B is formulated in a unified framework which is trained end to end by allowing for computing back-propagations through all layers.

Figure 3:
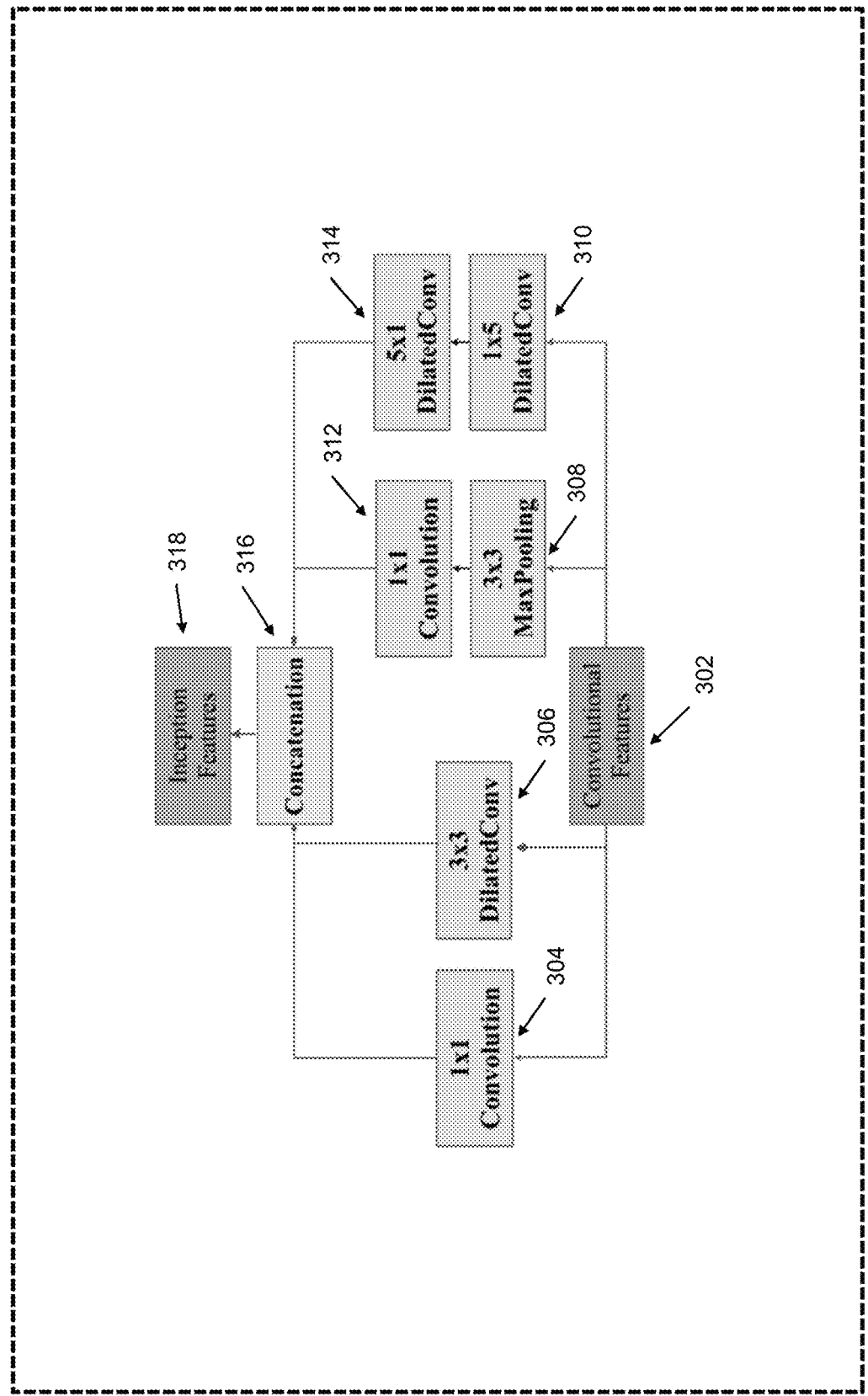
FIG. 3 is the structure of a text inception module according to an embodiment of the present application.

FIG. 3 is the structure of a text inception module 125C according to an embodiment of the present application. It is applied to those convolutional layers 304, 306, 310, 312, and 314 which are used to predict word bounding boxes 130. The convolutional maps in a layer are processed through four different convolutional operations: 1×1-conv 304, 3×3-conv 306, 3×3-pool 308 with 1×1-conv 312, and 5×5-conv 310 and 314. The 5×5-conv is decomposed into 1×5 310 and 5×1 314 convolution layers. Dilated convolutions, which support an exponential expansion of receptive field without loss of resolution or coverage, are applied. A hierarchical inception module 125C is proposed to aggregate stronger convolutional features based on this inception module as shown in FIG. 3 This allows it to capture richer context information by using multi-scale receptive fields. Then, the inception features 318 from multiple layers are aggregated and used to generate final AIF 215.

Each convolutional operation reduces the number of feature channels to 128. The final inception features 318 are generated by simply concatenating 316 four 128-channel features, resulting in 512-channel inception features 318. By using multiple convolutional operations with channel concatenation 316, the inception features 318 have multi-scale receptive fields and thus can focus on image content in a wide range of scales.

The convolutional features 302 is further enhanced by aggregating multi-layer inception features 318, which generates final AIFs at three key convolutional layers, as shown in FIG. 1. Each AIF, 125D, 125E, and 125F is computed by fusing the inception features of current layer with two directly adjacent layers. Down-sampling 125H and up-sampling 125J are applied to the lower layer and higher layer, respectively. These sampling operations ensure same feature resolutions for three inception features, which are combined together using channel concatenation.

The performance of the proposed solution of text detection is compared against state-of-the-art methods on three standard benchmarks for text detection. The experiment result shows demonstrated that the method and apparatus of the present application works reliably on the multi-scale and multi-orientation text.

FIG. 8 provides a flowchart illustrating processes and procedures that may be performed in an example embodiment for generating boundary boxed indication of text in an image. The flowchart provides an overview of the process.

At block 800, an example embodiment identifies, using a text attention module, text regions in the image via an automatically learned attention map by conducting pixel-wise review of text. The pixel-wise review may comprise the steps of: convoluting the image as a whole with a convolutional neural network to generate intermediate features, generating the attention map via a softmax function that uses the intermediate features, and performing pixel-wise multiplication between the attention map and the convolutional features to suppress background interference. The pixel-wise multiplication may comprise masking the background either by features or raw images. For example, this operation may include performing a pixel-wise operation on the background with features or a part of the original raw image.

At block 802, the example embodiment aggregates, using a hierarchical inception module, multi-scale inception features. Feature aggregation refers to downsampling the lower-level features, upsampling the higher-level features, and concatenating these resulting features with the current features. The aggregate process may comprise aggregating convolutional features, capturing context information by using multi-scale receptive fields, and aggregating multi-layer inception modules and enhancing the convolutional features towards text task. Each multi-layer inception module takes the input features and uses varying filter bank sizes and pooling operations in parallel. Each of the layers from the operations are concatenated together to make up the inception features.

At block 804, the example embodiment generates, using the hierarchical inception module and based on the multi-scale inception features, a set of aggregated inception features. Additional details regarding generating multi-scale inception features are discussed in greater detail above.

At block 806, the example embodiment generates, by a word prediction module and using the set of aggregated inception features, word-level text bounding boxes in the image. Additional details regarding generating word-level text bounding boxes as described in greater detail above.

This approach results in a fast yet accurate text detector that predicts word-level bounding boxes in a single shot. It also includes a unique unique text attention mechanism that encodes strong supervised information of text in training. And it further includes a hierarchical inception module that efficiently aggregates multi-scale inception features, enhances the detector by encoding more local details and stronger context information.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method comprising:
   identifying, by one or more processors, text regions in an image via an automatically learned attention map and by conducting pixel-wise review of text;
   aggregating, by the one or more processors, multi-scale inception features;
   generating, by the one or more processors and based at least in part on the multi-scale inception features, a set of aggregated inception features; and
   generating, by the one or more processors and using at least the set of aggregated inception features, word-level text bounding boxes in the image.

2. The method of claim 1, wherein conducting the pixel-wise review of text comprises:
   convoluting, by the one or more processors, the image as a whole with a convolutional neural network to generate intermediate features;
   generating, by the one or more processors, the attention map via a softmax function that uses the intermediate features; and
   performing, by the one or more processors, pixel-wise multiplication between the attention map and the convolutional features to suppress background interference.

3. The method of claim 2, wherein performing the pixel-wise multiplication comprises masking the background either by features or raw images.

4. The method of claim 1, further comprising:
   aggregating, by the one or more processors, convolutional features;
   capturing, by the one or more processors, context information by using multi-scale receptive fields; and
   aggregating, by the one or more processors, multi-layer inception modules and enhancing the convolutional features towards text task.

5. The method of claim 1, wherein (a) identifying the text regions is performed by a text attention module, and (b) aggregating multi-scale inception features is performed by a hierarchical inception module.

6. The method of claim 5, wherein (a) generating the set of aggregated inception features is performed by the hierarchical inception module and (b) generating the word-level text bounding boxes in the image is performed by a word prediction module.

7. A apparatus comprising at least a processor, and a memory associated with the processor having computer coded instructions therein, with the computer instructions configured to, when executed by the processor, cause the apparatus to:
   identify text regions in an image via an automatically learned attention map and by conducting pixel-wise review of text;
   aggregate multi-scale inception features;
   generate, based at least in part on the multi-scale inception features, a set of aggregated inception features; and
   generate, using at least the set of aggregated inception features, word-level text bounding boxes in the image.

8. The apparatus of claim 7, wherein the conducting the pixel-wise review of text comprises:
   convolute the image as a whole with a convolutional neural network to generate intermediate features;
   generate the attention map via a softmax function that uses the intermediate features; and
   perform pixel-wise multiplication between the attention map and the convolutional features to suppress background interference.

9. The apparatus of claim 8, wherein performing the pixel-wise multiplication comprises masking the background either by features or raw images.

10. The apparatus of claim 7, further comprising:
    aggregate convolutional features;
    capture context information by using multi-scale receptive fields; and
    aggregate multi-layer inception modules and enhancing the convolutional features towards text task.

11. The apparatus of claim 7, wherein (a) identifying the text regions is performed by a text attention module, and (b) aggregating multi-scale inception features is performed by a hierarchical inception module.

12. The apparatus of claim 7, wherein (a) generating the set of aggregated inception features is performed by the hierarchical inception module and (b) generating the word-level text bounding boxes in the image is performed by a word prediction module.

13. A computer program product comprising at least one non-transitory computer-readable storage medium having computer-readable program code portions stored therein, the computer-readable program code portions comprising:
    an executable portion configured to identify text regions in an image via an automatically learned attention map and by conducting pixel-wise review of text;
    an executable portion configured to aggregate multi-scale inception features;
    an executable portion configured to generate, based at least in part on the multi-scale inception features, a set of aggregated inception features; and
    an executable portion configured to generate, using at least the set of aggregated inception features, word-level text bounding boxes in the image.

14. The computer program product of claim 13, wherein the conducting the pixel-wise review of text comprises:
    convolute the image as a whole with a convolutional neural network to generate intermediate features;
    generate the attention map via a softmax function that uses the intermediate features; and
    perform pixel-wise multiplication between the attention map and the convolutional features to suppress background interference.

15. The computer program product of claim 14, wherein performing the pixel-wise multiplication comprises masking the background either by features or raw images.

16. The computer program product of claim 13, further comprising:
- an executable portion aggregate convolutional features;
- an executable portion capture context information by using multi-scale receptive fields; and
- an executable portion aggregate multi-layer inception modules and enhancing the convolutional features towards text task.

17. The computer program product of claim 13, wherein (a) identifying the text regions is performed by a text attention module, and (b) aggregating multi-scale inception features is performed by a hierarchical inception module.

18. The computer program product of claim 13, wherein (a) generating the set of aggregated inception features is performed by the hierarchical inception module and (b) generating the word-level text bounding boxes in the image is performed by a word prediction module.

* * * * *